US008138467B2

(12) United States Patent
Kim et al.

(10) Patent No.: US 8,138,467 B2
(45) Date of Patent: Mar. 20, 2012

(54) COLOR FILTER ARRAY INCLUDING COLOR FILTERS ONLY OF FIRST TYPE AND SECOND TYPE, METHOD OF FABRICATING THE SAME, AND IMAGE PICKUP DEVICE INCLUDING THE SAME

(75) Inventors: Bum Suk Kim, Seoul (KR); Jung Chak Ahn, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 274 days.

(21) Appl. No.: 12/457,910

(22) Filed: Jun. 25, 2009

(65) Prior Publication Data
US 2009/0321617 A1 Dec. 31, 2009

(30) Foreign Application Priority Data

Jun. 26, 2008 (KR) .................. 10-2008-0060891

(51) Int. Cl.
*G01J 3/50* (2006.01)
(52) U.S. Cl. ..................... 250/226; 250/208.1
(58) Field of Classification Search .................. 250/226, 250/208.1, 239, 216; 257/440, 291–294; 348/273, 274
See application file for complete search history.

(56) References Cited

U.S. PATENT DOCUMENTS

| 6,008,843 | A  | * | 12/1999 | Yu ................................. 348/274 |
| 7,259,789 | B1 | * | 8/2007 | Endo et al. .................... 348/274 |
| 2007/0272836 | A1 | | 11/2007 | Higashitsutsumi et al. |

FOREIGN PATENT DOCUMENTS

| JP | 2006-210701 | 8/2006 |
| JP | 2007-311447 | 11/2007 |
| KR | 10-2006-0005575 | 1/2006 |
| KR | 10-2007-0111379 | 11/2007 |

* cited by examiner

*Primary Examiner* — Que T Le
(74) *Attorney, Agent, or Firm* — Harness, Dickey & Pierce, P.L.C.

(57) ABSTRACT

An image pickup device includes a pixel array including a plurality of photo sensitive devices and a color filter array including a plurality of color filters each disposed above a corresponding one of the plurality of photo sensitive devices. The color filters include a first type color filter formed on a glass substrate to filter light to pass a first spectrum and a second type color filter stacked on at least part of the first type color filter to filter light to pass a second spectrum. Accordingly, fabrication of a color filter array can be simplified and a color filter array having a small lay out can be fabricated.

20 Claims, 7 Drawing Sheets

COLOR FILTER ARRAY INCLUDING COLOR FILTERS ONLY OF FIRST TYPE AND SECOND TYPE, METHOD OF FABRICATING THE SAME, AND IMAGE PICKUP DEVICE INCLUDING THE SAME

FOREIGN PRIORITY STATEMENT

This application claims priority under 35 U.S.C. §119 to Korean Patent Application No. 10-2008-0060891, filed on Jun. 26, 2008, in the Korean Intellectual Property Office (KIPO), the entire contents of which are incorporated herein by reference.

BACKGROUND

1. Field

Example embodiments relate to an image pickup device, and more particularly, to a color filter array which may have a small layout area and simple fabrication process, a method of fabricating the same, and an image pickup device including the same.

2. Description of the Related Art

An image pickup device may be a semiconductor device converting an optical image into an electrical signal. An image pickup device using a charge coupled device (CCD) and a complementary metal-oxide semiconductor (CMOS) image sensor (CIS) using a CMOS process may be used, usually. Since the CIS may be fabricated using a normal CMOS process, it may be more economical than the image pickup device using the CCD. In addition, since the CIS may be integrated into a single chip with an analog-to-digital converter, the CIS may be advantageous in terms of integration. Furthermore, as a low-power and low-voltage CIS design becomes possible, the CIS may be widely used in portable devices including, for example, mobile phones and digital cameras having low power consumption.

A pixel array of an image pickup device may include a plurality of pixels arrayed in a two-dimensional matrix of rows and columns. Each of the pixels may convert photoelectrons generated from light energy into a digital signal to output an image signal. The image pickup device may output a black-and-white image having only brightness information of an object. Therefore, a color filter array, for example, a primary or complementary color filter array, may need to be provided at a light receiving side of the pixel array in order to display a color image. The color filter array may include a plurality of color filters and control the brightness by applying a signal corresponding to a color of each of the color filters so that a color image can be displayed.

Recently, the demand for high pixel density, high resolution, high picture quality, and high speed has been increasing continuously, with respect to image pickup devices. With the increase of resolution, the number of pixels included in a pixel array may be increasing and the layout size of each pixel may be decreasing. When the layout area of a color filter array does not change even if the layout area of each pixel decreases, a distance between a microlens installed to collect light and a photo sensitive device (or a light receiving device) may increase. As a result, the sensitivity of the color filter array may decrease. Therefore, with the decrease of the layout area of a pixel, a color filter array which is thinner and has a smaller layout area may be desired.

In addition, as the price of image pickup devices decreases due to the development of semiconductor technology, competition for reducing a unit cost in terms of productivity and fabrication cost may increase. Accordingly, a color filter array and method of fabricating the same, by which the production cost is reduced and competitiveness is increased by simplifying complicated conventional processes of fabricating a color filter, may be desired.

SUMMARY

Example embodiments provide a color filter array which may have a thin and small layout and a method of fabricating the same.

Example embodiments provide a color filter array and method of fabricating the same, by which the production cost may be reduced by simplifying processes of fabricating the color filter array.

Example embodiments provide a method of fabricating a color filter array. The method may include forming a first type color filter filtering light to pass a first spectrum on a glass substrate and forming a second type color filter stacked on at least part of the first type color filter to filter light to pass a second spectrum. The first spectrum may be a yellow spectrum and the second spectrum may be a cyan spectrum.

Example embodiments provide a color filter array which may include a glass substrate, a first type color filter formed on the glass substrate to filter light to pass a first spectrum, and a second type color filter stacked on at least part of the first type color filter to filter light to pass a second spectrum. The first spectrum may be a yellow spectrum and the second spectrum may be a cyan spectrum. The second type color filter may be stacked on the at least part of the first type color filter and may function to filter light to pass a green spectrum.

Example embodiments provide an image pickup device which may include a pixel array comprising a plurality of photo sensitive devices arrayed in a matrix and a color filter array comprising a plurality of color filters each disposed above a corresponding one of the plurality of photo sensitive devices. The color filters may include a first type color filter formed on a glass substrate to filter light to pass a first spectrum and a second type color filter stacked on at least part of the first type color filter to filter light to pass a second spectrum. The first spectrum may be a yellow spectrum and the second spectrum may be a cyan spectrum. The second type color filter stacked on the at least part of the first type color filter may function to filter light to pass a green spectrum.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
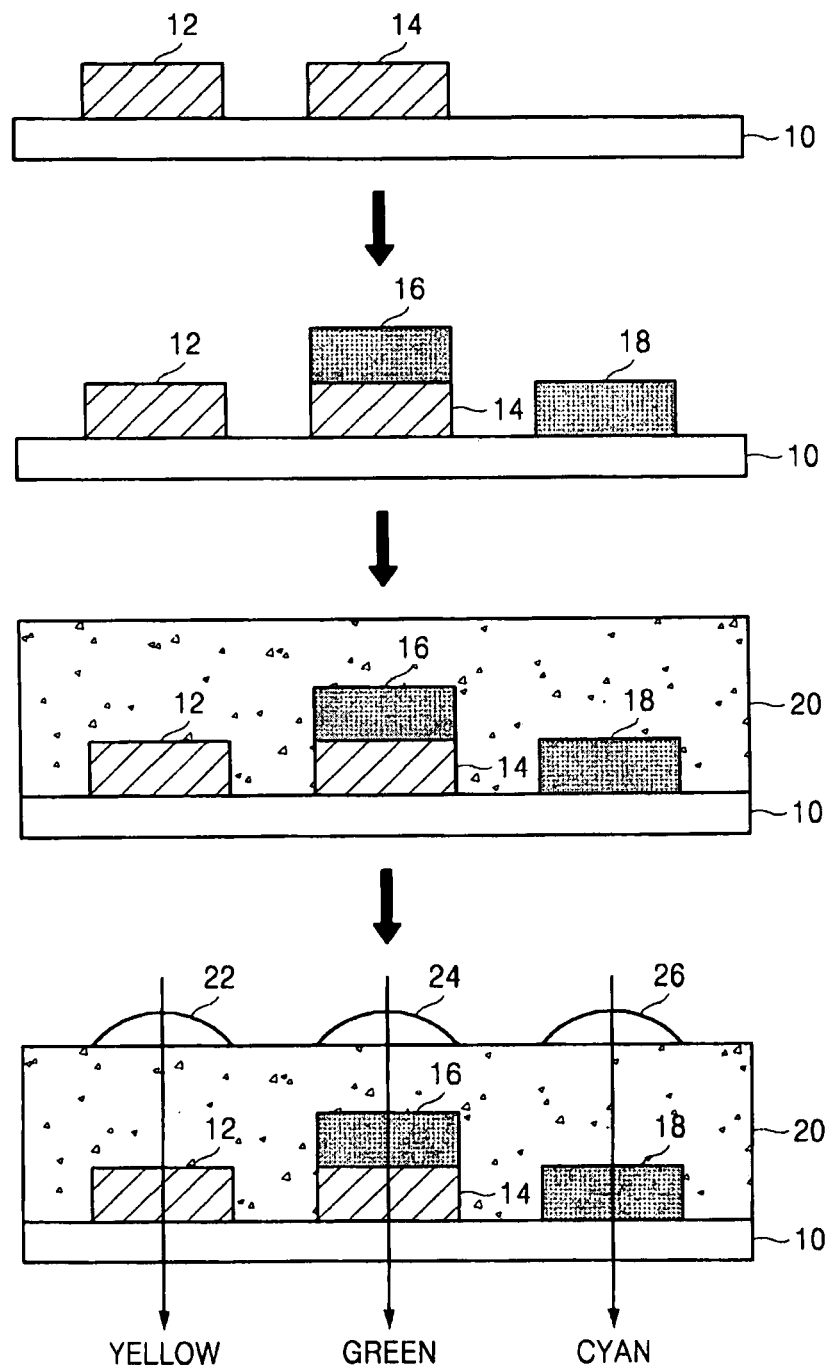
FIG. 1 illustrates a method of fabricating a color filter array according to example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, a method of fabricating a color filer array using photolithography according to example embodiments will be described with reference to FIGS. 1 through 5. However, example embodiments are not restricted to the examples illustrated in FIGS. 1 through 5. FIG. 1 illustrates a method of fabricating a color filter array according to example embodiments. FIG. 1 shows cross-sections in stages of forming first, second and third color filters. The first color filter may filter light to pass a yellow spectrum. The second color filter may filter light to pass a cyan spectrum. The third color filter may filter light to pass a green spectrum.

Referring to FIG. 1, the color filter array may include a glass substrate 10, a plurality of color filters for manifesting a color image, and an interlayer insulating film 20. The structure of the color filter array may change depending on a type of an image pickup device including the color filter array and a liquid crystal mode. In fabricating the color filter array, a first type, e.g., yellow type, photoresist may be applied on the glass substrate 10, which may be cleaned beforehand. A photo mask may be put on the glass substrate 10 having the first type photoresist thereon and exposure and development may be sequentially performed. As a result, a portion of the first type photoresist exposed through the photo mask may be removed and the remaining portion of the first type photoresist may form a first pattern 12 and a second pattern 14 on the glass substrate 10. According to example embodiments, first and second patterns 12 and 14 may be yellow filters filtering light to pass the yellow spectrum, and may be formed on the glass substrate 10.

Thereafter, a second type, e.g., cyan type, photoresist may be applied on the first and second patterns 12 and 14 and the glass substrate 10. A photo mask may be put on the glass substrate 10 having the second type photoresist and exposure and development are sequentially performed. As a result, a portion of the second type photoresist exposed through the photo mask may be removed and the remaining portion of the second type photoresist may form a third pattern 16 and a fourth pattern 18. At this time, the third pattern 16 of the second type photoresist may be formed on the second pattern 14 of the first type photoresist. According to example embodiments, third and fourth patterns 16 and 18 may be cyan filters filtering light to pass the cyan spectrum, and may be formed on the glass substrate 10.

Consequently, a first color filter including a yellow filter 12, a second color filter including a cyan filter 18, and a third color filter including a yellow filter 14 and a cyan filter 16 stacked on the yellow filter may be formed on the glass substrate 10. The third color filter may transmit light which passes through a first type color filter, for example the yellow filter 14 and a second type color filter, for example, the cyan filter 16. For instance, the third color filter may filter light to pass the green spectrum by filtering the light to pass the cyan spectrum using the cyan filter 16 and filtering the filtered light to pass the yellow spectrum using the yellow filter 14.

As described above, the third color filter may be formed by stacking different kinds of color filters, for example the yellow filter 14 and the cyan filter 16. According to example embodiments, the stacking order of the first and second type color filters may be reversed. In conventional methods of fabricating a color filter, at least three mask processes may be performed to create different color filters which filter light to pass predetermined color spectrums. To the contrary, according to example embodiments, three color filters may be created through two mask processes, so that color filter fabrication may be simplified.

The interlayer insulating film 20 may be formed on the glass substrate 10 to cover each of the plurality of color filters on substrate 10. The interlayer insulating film 20 may be formed to planarize the color filters formed on the glass substrate 10 and/or to increase adhesion to a transparent electrode, e.g., indium tin oxide (ITO) (not shown). In addition, a black matrix (BM) may be formed within the interlayer insulating film 20 in order to prevent light passing through the color filters from being incident on part other than a light receiving region.

In addition, microlenses 22, 24, and 26 may be disposed above photo sensitive devices (not shown) to refract incident light and focus more light on the photo sensitive devices, The microlenses 22, 24, and 26 may increase the photosensitivity of the color filters. As illustrated in FIG. 1, light collected by the microlenses 22, 24, and 26 may be filtered by the first through third color filters, respectively, and the filtered light may be incident on a photo sensitive device corresponding to a color filter that has filtered the light. For instance, the first filter, e.g., the yellow filter 12, may filter light to pass the yellow spectrum, which may be incident on a corresponding photo sensitive device. The second color filter, e.g., the cyan filter 18 may filter the light to pass the cyan spectrum, which may be incident on a corresponding photo sensitive device. The third color filter may filter light to pass the cyan spectrum and the yellow spectrum by transmitting light that has passed through the first type color filter, e.g., the yellow filter 14, and the second type color filter, e.g., the cyan filter 16. The filtered light may be incident on a corresponding photo sensitive device.

Figure 2A:
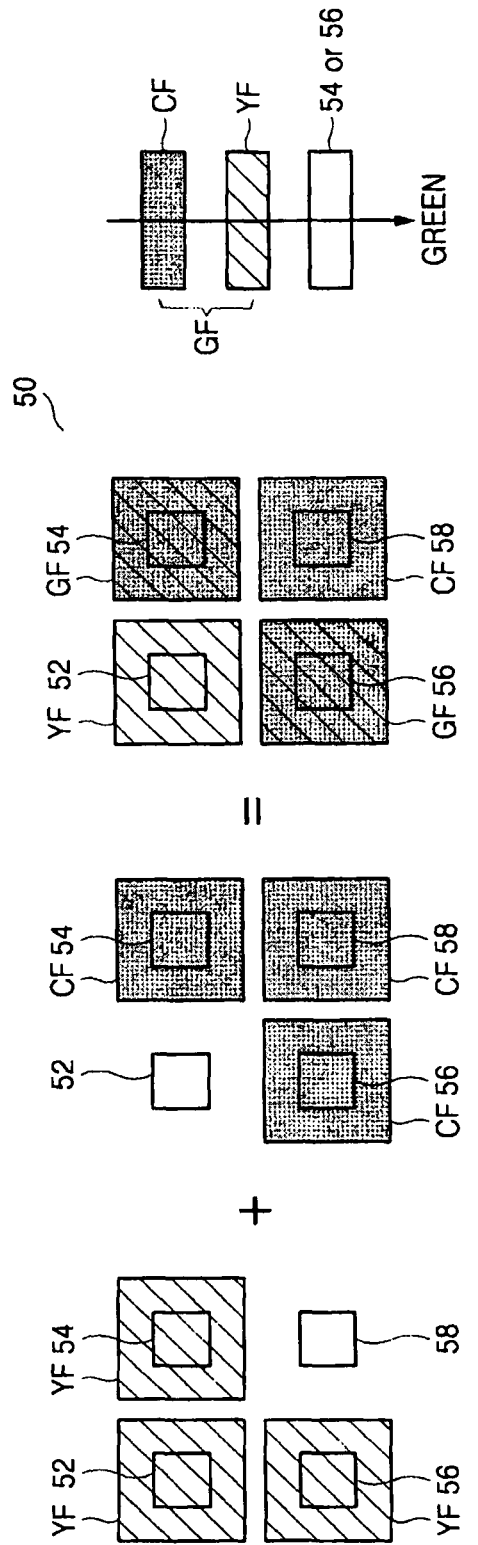
FIG. 2A illustrates an example of the color filter array fabricated using the method illustrated in FIG. 1.
Figure 2B:
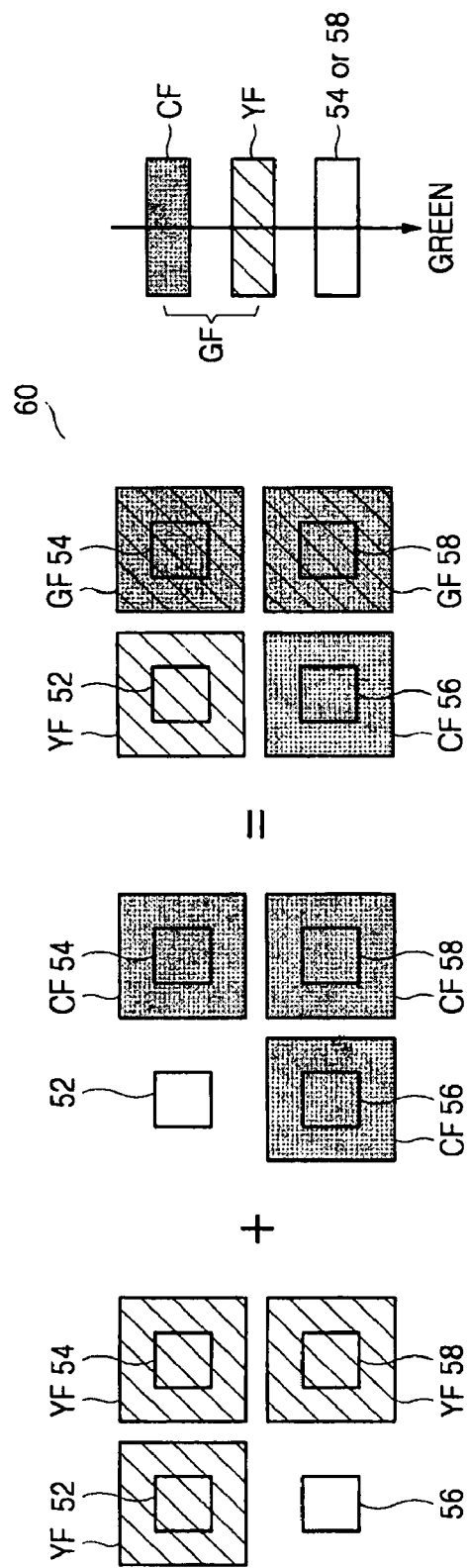
FIG. 2B illustrates another example of the color filter array fabricated using the method illustrated in FIG. 1.

FIG. 2A illustrates an example of the color filter array fabricated using the method illustrated in FIG. 1. FIG. 2B illustrates another example of the color filter array fabricated using the method illustrated in FIG. 1. FIGS. 2A and 2B show arrangements of the color filter array corresponding to a 2×2 pixel array 50 and 60, respectively, each of which may include a plurality of pixels 52, 54, 56, and 58.

Each of the pixels 52, 54, 56, and 58 may generate charges in response to incident light and accumulate the charges. Each of the pixels 52, 54, 56, and 58 may be implemented by a photo diode, a photo transistor, a photo gate, a pinned photo diode (PPD), or a combination thereof. According to example embodiments, each of the pixels 52, 54, 56, and 58 may sense a particular spectrum, e.g., one of the yellow, cyan and green spectrums.

A color filter that may transmit light in the spectrum corresponding to each pixel 52, 54, 56, or 58 may be disposed above each of the pixels 52, 54, 56, and 58. For example, a pixel sensing the yellow spectrum may be disposed below a yellow filter YF, which may filter light and may transmit the yellow spectrum. A pixel sensing the cyan spectrum may be disposed below a cyan filter CF, which may light and may transmit the cyan spectrum. A pixel sensing the green spectrum may be disposed below a green filter GF, which may include a plurality of color filters to filter light and transmit the green spectrum.

Referring to FIG. 2A, the 2×2 pixel array 50 may include the first pixel 52 sensing the yellow spectrum, the second and third pixels 54 and 56 sensing the green spectrum, and the fourth pixel 58 sensing the cyan spectrum. According to example embodiments, the yellow filter YF, which may filter light and transmit the yellow spectrum, may be disposed above each of the first through third pixels 52, 54, and 56. In addition, the cyan filter CF, which may filter light and transmit the cyan spectrum, may be disposed above each of the second through fourth pixels 54, 56, and 58. According to example embodiments, the yellow filter YF and the cyan filter CF may be stacked above each of the second and third pixels 54 and 56, and may form the third color filter.

The third color filter may filter light to transmit the cyan spectrum through the cyan filter CF and then filter the filtered light to transmit the yellow spectrum through the yellow filter YF. The light after being filtered by the cyan filter CF and the yellow filter YF may be light in the green spectrum. Accordingly, the color filter array may filter light and transmit the green spectrum using the cyan filter CF and the yellow filter YF. Hereinafter, the third color filter formed by stacking the yellow filter YF and the cyan filter CF is referred to as a green color filter GF (=YF+CF).

Referring to FIG. 2B, according to example embodiments, the 2×2 pixel array 60 may include the first pixel 52 sensing the yellow spectrum, the second and fourth pixels 54 and 58 sensing the green spectrum, and the third pixel 56 sensing the cyan spectrum. According to example embodiments, the yellow filter YF, which may filter light and transmit the yellow spectrum, may be disposed above each of the first, second and fourth pixels 52, 54, and 58. In addition, the cyan filter CF, which may filter light and transmit the cyan spectrum, may be disposed above each of the second through fourth pixels 54, 56, and 58. According to example embodiments, the yellow filter YF and the cyan filter CF may be stacked above each of the second and fourth pixels 54 and 58, and may form the third color filter, e.g., the green filter GF (=YF+CF).

The third color filter, e.g., the green filter GF may filter light to transmit the cyan spectrum through the cyan filter CF and then filter the filtered light to transmit the yellow spectrum through the yellow filter YF. Accordingly, the third color filter, e.g., the green filter GF may filter light and transmit the green spectrum.

As described above, in the method of fabricating a color filter array according to example embodiments, a color filter may be formed by stacking different kinds of color filters, and therefore, the number of mask processes may be reduced. For instance, the green filter GF may be formed by stacking the yellow filter YF and the cyan filter CF in the color filter array, so that a mask process for forming the green filter GF may be eliminated. Consequently, the number of mask processes for forming color filters may be reduced and fabrication of a color filter array may be simplified.

Figure 3:
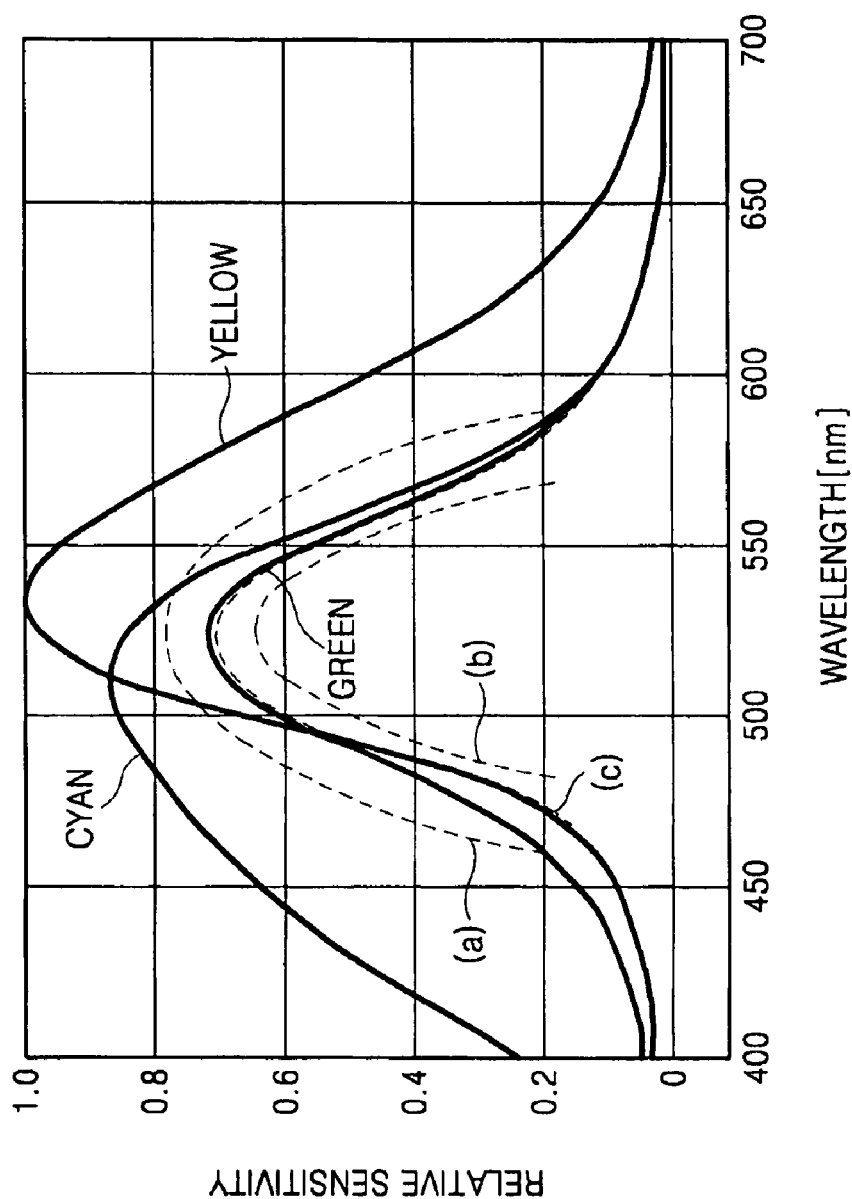
FIG. 3 is a graph showing the spectral characteristics of a photo sensitive device according to example embodiments.

FIG. 3 is a graph showing the spectral characteristics of a photo sensitive device according to example embodiments. The horizontal axis is the wavelength of light and the vertical axis is relative photosensitivity. The graph illustrated in FIG. 3 shows the spectral or transmissive characteristics of a complementary color filter.

Referring to FIG. 3, the photo sensitive device shows different opto-electric conversion characteristics in different spectrums, e.g., the yellow spectrum YELLOW, the green spectrum GREEN, and the cyan spectrum CYAN. For example, the photo sensitive device may absorb a wavelength ranging from 500 to 600 nm in the yellow spectrum YELLOW, a wavelength ranging from 450 to 550 nm in the cyan spectrum CYAN, and a wavelength ranging from 500 to 550 nm in the green spectrum GREEN.

An image pickup device may display a color image using a color filter array including a plurality of color filters, e.g., the yellow filter YF, the cyan filter CF, and the green filter GF, having different spectral characteristics. In fabricating the color filter array, a plurality of mask processes may be required to form the plurality of color filters. At this time, the spectral characteristic of each color filter may be different due to a process, material, and so on in a mask process for forming the color filter. For example, although a wavelength ranging from 500 to 600 nm is normally transmitted in the green spectrum GREEN, the range of a wavelength transmitted by the green filter GF may be a first range "a" or a second range "b" according to the density of photoresist used to form a color filter. This change in sensitivity of the color filters, e.g., the yellow filter YF, the cyan filter CF, and the green filter GF, may degrade the entire characteristics of the color filter array.

However, when the green filter GF is formed by stacking the yellow filter YF and the cyan filter CF according to example embodiments, the green filter GF may filter visible light to pass a wavelength ranging 500 to 600 nm in the yellow spectrum YELLOW through the yellow filter YF and then filter the filtered light to pass a wavelength ranging from 450 to 550 nm in the cyan spectrum CYAN through the cyan filter CF, thereby reflecting or absorbing a wavelength range of the visible light excluding portions of the yellow spectrum YELLOW and the cyan spectrum CYAN, that are outside a wavelength range of, for example, 500 to 550 nm.

As illustrated in FIG. 3, according to example embodiments, a range "c" of a wavelength transmitted by the green filter GF may be the same as the transmitted wavelength ranging from 500 to 550 nm in the green spectrum GREEN. Consequently, when the yellow filter YF and the cyan filter CF are stacked regardless of the change in sensitivity of the color filters in the method fabricating a color filter array according to example embodiments, a color filter having a spectral characteristic without an unnecessary wavelength range may be fabricated, thereby increasing the sensitivity of the color filter array.

Figure 4:
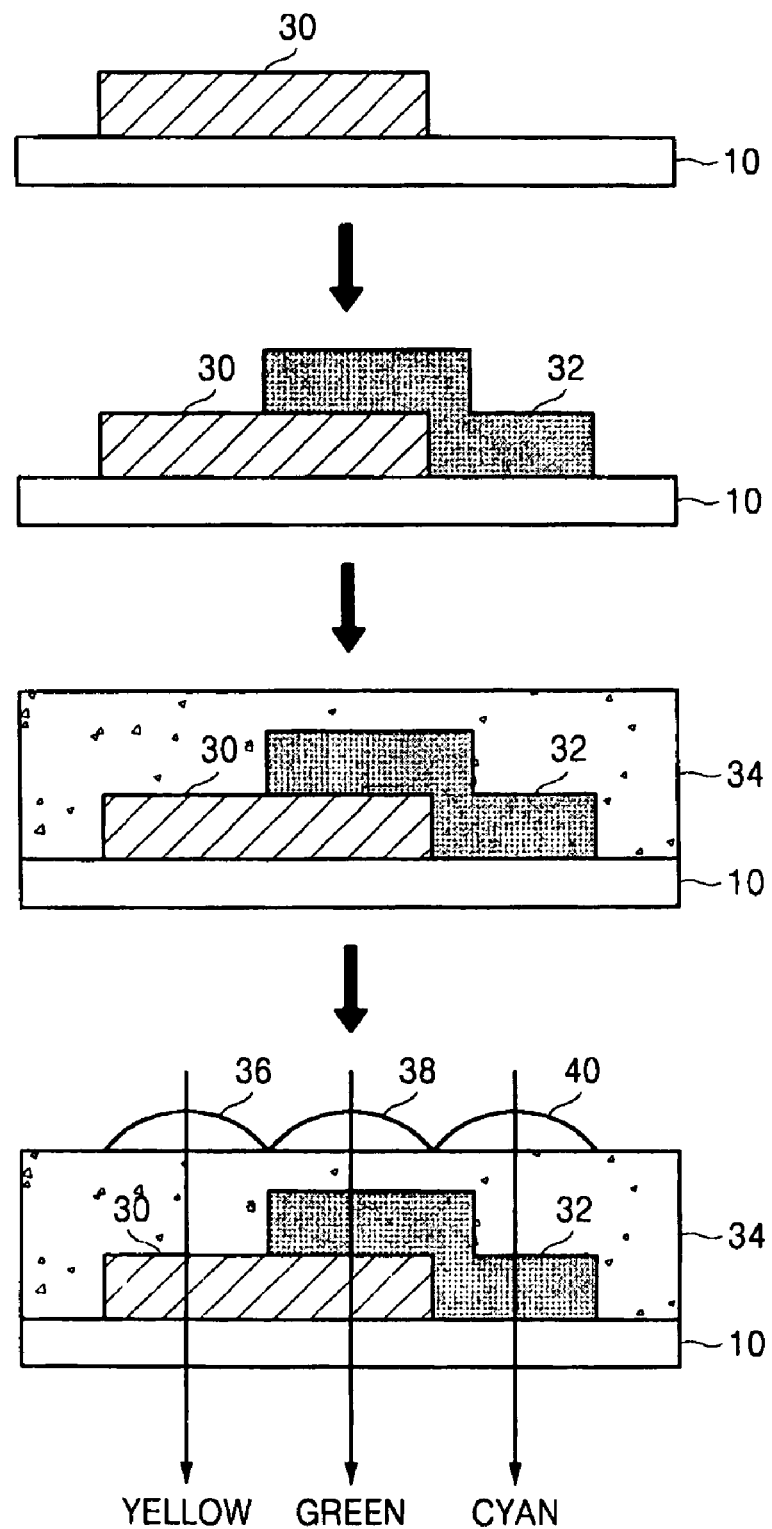
FIG. 4 illustrates a method of fabricating a color filter array according example embodiments

FIG. 4 illustrates a method of fabricating a color filter array according to example embodiments. FIG. 4 shows cross-sections in stages of forming first, second and third color filters. The first color filter may filter light to pass a yellow spectrum. The second color filter may filter light to pass a cyan spectrum. The third color filter may filter light to pass a green spectrum.

Referring to FIG. 4, the color filter array may include the glass substrate 10, a plurality of color filters for manifesting a color image, and an interlayer insulating film 34. In fabricating the color filter array, a first type, e.g., yellow type, photoresist may be applied on the glass substrate 10, which may have been cleaned beforehand. A photo mask may be put on the glass substrate 10 having the first type photoresist thereon and exposure and development may be sequentially performed. As a result, a portion of the first type photoresist exposed through the photo mask may be removed and the remaining portion of the first type photoresist may form a fifth pattern 30 on the glass substrate 10. At this time, the fifth pattern 30 may form the first color filter and extend to an area in which the third color filter will be formed.

Thereafter, a second type, e.g., cyan type, photoresist may be applied on the fifth pattern 30 and the glass substrate 10. A photo mask may be put on the glass substrate 10 having the second type photoresist and exposure and development may be sequentially performed. As a result, a portion of the second type photoresist exposed through the photo mask may be removed and the remaining portion of the second type photoresist may form a sixth pattern 32. At this time, the sixth pattern 32 may form the second color filter and extend to the area in which the third color filter will be formed. In addition, the sixth pattern 32 may be formed to be stacked on at least part of the fifth pattern 30.

Consequently, part of the fifth pattern 30 formed on the glass substrate 10 may form the first color filter, part of the sixth pattern 32 may form the second color filter, and at least part of the fifth pattern 30 and at least part of the sixth pattern 32 may be stacked, forming the third color filter. According to example embodiments, patterns of different kinds of color filters, e.g., a yellow filter and a cyan filter may be formed to extend and overlap each other on the glass substrate 10, thereby forming a green filter.

In addition, microlenses 36, 38, and 40 may be disposed above photo sensitive devices (not shown) to increase the photosensitivity of the color filters. As illustrated in FIG. 4, light collected by the microlenses 36, 38, and 40 may be filtered by the first through third color filters, respectively, and the filtered light may be incident on a photo sensitive device corresponding to a color filter that has filtered the light. For instance, the first filter, e.g., the yellow filter, may filter light to pass the yellow spectrum, which may be incident on a corresponding pixel. The second color filter, e.g., the cyan filter, may filter the light to pass the cyan spectrum, which may be incident on a corresponding pixel. The third color filter, e.g., the green filter, may filter the light to pass the green spectrum, which may be incident on a corresponding pixel.

Figure 5:
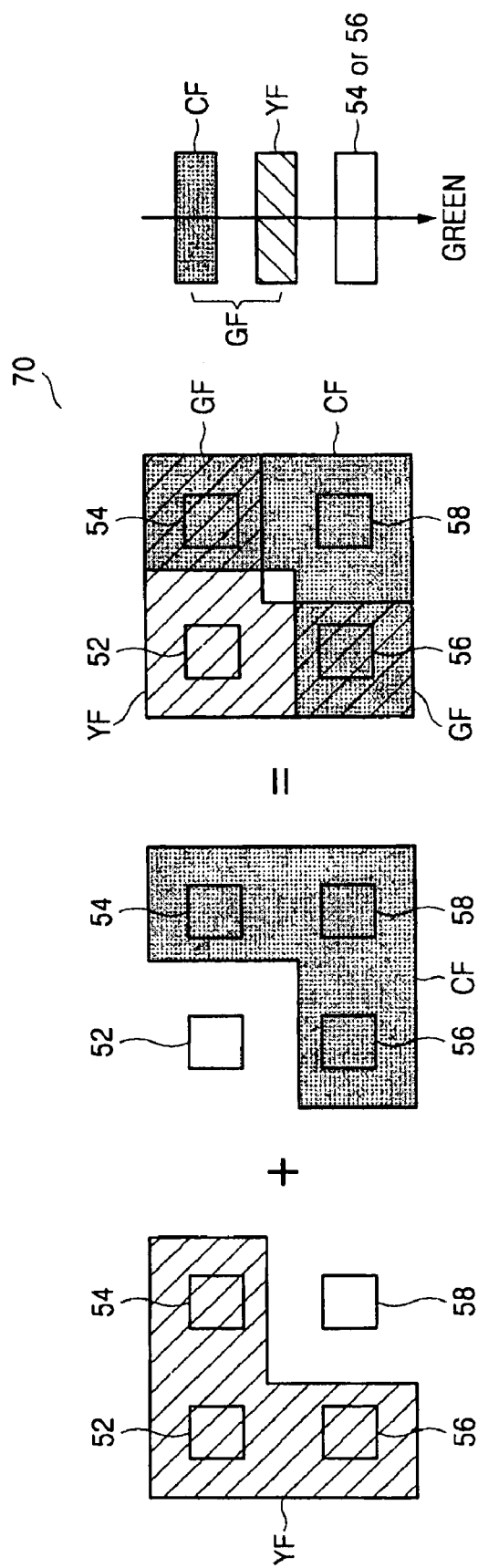
FIG. 5 illustrates an example of a color filter array fabricated using the method illustrated in FIG. 4.

FIG. 5 illustrates an example of a color filter array fabricated using the method illustrated in FIG. 4. FIG. 5 shows an arrangement of the color filter array corresponding to a 2×2 pixel array 70 which may include a plurality of the pixels 52, 54, 56, and 58. Referring to FIG. 5, the 2×2 pixel array 70 may include the first pixel 52, which may sense the yellow spectrum, the second and third pixels 54 and 56, which may sense the green spectrum, and the fourth pixel 58, which may sense the cyan spectrum.

A yellow filter YF, which may filter light to pass the yellow spectrum, may be disposed above the first through third pixels 52, 54, and 56. According to example embodiments, the yellow filter YF may be disposed above the second and third pixels 54 and 56, which may be sensing the green spectrum, as well as the first pixel 52, which may be sensing the yellow spectrum. In addition, a cyan filter CF, which may filter light to pass the cyan spectrum, may be disposed above the second through fourth pixels 54, 56, and 58. According to example embodiments, the cyan filter CF may be disposed above the second and third pixels 54 and 56, which may be sensing the green spectrum, as well as the fourth pixel 58, which may be sensing the cyan spectrum. Consequently, the yellow filter YF and the cyan filter CF may be stacked above the second and third pixels 54 and 56, and may form a green filter GF (=YF+CF).

When a mask process is repeated to form a plurality of different color filters on a small layout area of a color filter array, a color filter formed previously may be etched through repeated exposure and development, and therefore, a defect ratio may increase. Accordingly, the smaller the layout area of a color filter array is, the more complicated and difficult the mask process for forming a color filter may become.

However, according to example embodiments, a pattern of a color filter for one pixel may be extended to form a pattern of a color filter for another adjacent pixel, and therefore, fabrication may be simplified. Though FIG. 5 illustrates color filters having particular relative sizes, the color filters illustrated in FIG. 5 are only examples, and the sizes of the yellow filter YF, the green filter GF and the cyan filter CF may be different, and may vary with aspects of the fabrication processes including, for example, a pattern or arrangement of the color filters. Accordingly example embodiments are not restricted to the relative sizes of the color filters illustrated in FIG. 5.

A color filter array according to example embodiments may be fabricated using one of the methods illustrated in FIGS. 1 and 4.

Figure 6:
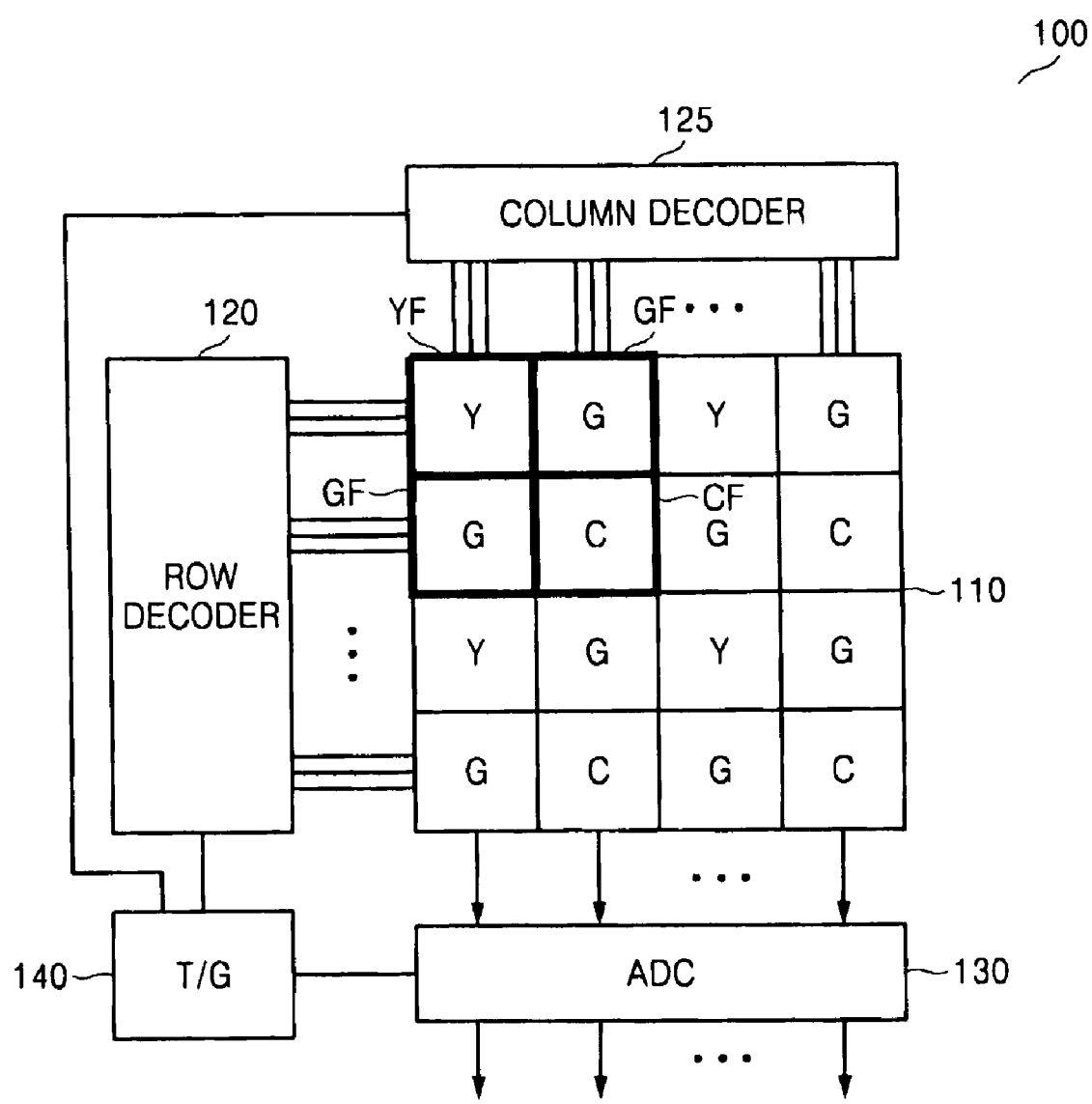
FIG. 6 is a block diagram of an image pickup device including a color filter array according to example embodiments.

FIG. 6 is a block diagram of an image pickup device 100 including a color filter array according to example embodiments. Referring to FIG. 6, the image pickup device 100 may include a pixel array, a color filter array 110, a row decoder 120, a column decoder 125, a timing generator (T/G) 140, and an analog-to-digital converter (ADC) 130. The image pickup device 100 may be implemented by a single chip.

The pixel array may include a plurality of pixels Y, G, and C arrayed in a two-dimensional matrix of rows and columns. Each of the pixels Y, G, and C may convert light in a corresponding spectrum among the yellow, cyan and green spectrums into an electrical signal. The color filter array 110 may include a plurality of color filters YF, GF, and CF. A color filter transmitting a particular spectrum may be disposed above a corresponding pixel. The color filters YF, GF, and CF may include a yellow filter YF, which may filter light to pass the yellow spectrum, a green filter GF, which may filter light to pass the green spectrum, and a cyan filter CF, which may filter light to pass the cyan spectrum. Each of the pixels Y, G, and C may sense light that has passed through a corresponding one of the color filters YF, GF, and CF and may generate an electrical signal as a sensing result.

The row decoder 120 may be connected with the pixel array and may select a row in the pixel array sequentially or in predetermined order in response to control signals output from the T/G 140. The column decoder 125 may be connected with the pixel array and may select a column in the pixel array sequentially or in predetermined order in response to control signals output from the T/G 140. According to example embodiments, the pixel array may output analog signals to the ADC 130 including, for example, a reset signal and an image signal generated from at least one pixel selected by the row decoder 120 and the column decoder 125.

The T/G 140 may generate at least one control signal for controlling the operation of at least one among the pixel array, the color filter array 110, the row decoder 120, the column decoder 125, and the ADC 130. The ADC 130 may convert an analog signal output from each pixel into a digital signal.

According to example embodiments, a color filter array having a thin and small layout may be fabricated. In addition, the numbers of photo masks and exposures used during the fabrication may be reduced, and therefore, fabrication may be simplified. As a result, fabrication efficiency may be increased and production cost may be decreased. Furthermore, a green filter may be formed by stacking a yellow filter and a cyan filter, and, as a result, may have improved spectral characteristics.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of fabricating a color filter array, the method comprising:
    forming, on a glass substrate, a first type color filter to filter light to pass a spectrum of a first color;
    forming a second type color filter stacked on at least part of the first type color filter to filter light to pass a spectrum of second color; and
    forming an insulating layer on the color filter array, the color filter array including color filters only of the first type and the second type.

2. The method of claim 1, wherein the first type color filter and the second type color filter are formed so the fabricated filter passes spectrums of at least three different colors and includes color filters of only a first and second type.

3. The method of claim 1, wherein the first type color filter and the second type color filter are formed so the fabricated filter array includes one or more unit filters, the unit filters each including four adjacent filter regions, the four adjacent filter regions having the shape of a 2×2 array.

4. The method of claim 3, wherein the four adjacent filter regions include
    a first filter region formed by portions of the glass substrate where the first type color filter exists and the second type color filter is not stacked on the first type color filter,
    a second filter region formed by portions of the glass substrate where the second type color filter is stacked on the first type color filter,
    a third filter region formed by portions of the glass substrate where the second type color filter is stacked on the first type color filter, and
    a fourth filter region formed by portions of the glass substrate where the second type color filter exists and is not stacked on the first type color filter.

5. The method of claim 4, wherein the first filter region passes the spectrum of the first color, the second filter region passes a spectrum of a third color, the third filter region passes the spectrum of the third color, and the fourth filter region passes the spectrum of the second color.

6. The method of claim 1, wherein the spectrum of the first color is a yellow spectrum and the spectrum of the second color is a cyan spectrum.

7. A color filter array comprising:
    a glass substrate;
    a first type color filter formed on the glass substrate, the first type color filter being configured to filter light to pass a spectrum of a first color; and
    a second type color filter stacked on at least part of the first type color filter, the second type color filter being configured to filter light to pass a spectrum of a second color; and
    an insulating layer covering the first type color filter and the second type color filter,
    wherein the color filter array includes color filters only of the first type and the second type.

8. The color filter array of claim 7, wherein the color filter array is configured to pass spectrums of at least three different colors and includes color filters of only a first and second type.

9. The color filter array of claim 7, wherein the first type color filter and the second type color filter are arranged to form one or more unit filters, the unit filters each including four adjacent filter regions, the four adjacent filter regions having the shape of a 2×2 array.

10. The color filter array of claim 9, wherein the four adjacent filter regions include
    a first filter region formed by portions of the glass substrate where the first type color filter exists and the second type color filter is not stacked on the first type color filter,
    a second filter region formed by portions of the glass substrate where the second type color filter is stacked on the first type color filter,
    a third filter region formed by portions of the glass substrate where the second type color filter is stacked on the first type color filter, and
    a fourth filter region formed by portions of the glass substrate where the second type color filter exists and is not stacked on the first type color filter.

11. The color filter array of claim 10, wherein the first filter region is configured to pass the spectrum of the first color, the second filter region is configured to pass a spectrum of a third color, the third filter region is configured to pass the spectrum of the third color, and the fourth filter region is configured to pass the spectrum of the second color.

12. The color filter array of claim 7, wherein the first color is a yellow and the second color is a cyan.

13. The color filter array of claim 7, wherein portions of the first and second type color filters where the second type color filter is stacked on the first type color filter are configured to filter light to pass a green spectrum.

14. An image pickup device comprising:

a pixel array including a plurality of photo sensitive devices arrayed in a matrix; and the color filter array of claim 7, portions of the first and second type color filters each being disposed above a corresponding one of the plurality of photo sensitive devices.

15. The image pickup device of claim 14, wherein the color filter array is configured to pass spectrums of at least three different colors and includes color filters of only a first and second type.

16. The image pickup device of claim 14, wherein the first type color filter and the second type color filter are arranged to form one or more unit filters, the unit filters each including four adjacent filter regions, the four adjacent filter regions having the shape of a 2×2 array.

17. The image pickup device of claim 16, wherein the four adjacent filter regions include a first filter region formed by portions of the glass substrate where the first type color filter exists and the second type color filter is not stacked on the first type color filter, a second filter region formed by portions of the glass substrate where the second type color filter is stacked on the first type color filter, a third filter region formed by portions of the glass substrate where the second type color filter is stacked on the first type color filter, and a fourth filter region formed by portions of the glass substrate where the second type color filter exists and is not stacked on the first type color filter.

18. The image pickup device of claim 17, wherein the first filter region is configured to pass the spectrum of the first color, the second filter region is configured to pass a spectrum of a third color, the third filter region is configured to pass the spectrum of the third color, and the fourth filter region is configured to pass the spectrum of the second color.

19. The image pickup device of claim 14, wherein the spectrum of the first color is a yellow spectrum and the spectrum of the second color is a cyan spectrum.

20. The image pickup device of claim 14, wherein portions of the first and second type color filters where the second type color filter is stacked on the first type color filter are configured to filter light to pass a green spectrum.

* * * * *